United States Patent [19]
Peiser et al.

[11] 3,886,062
[45] May 27, 1975

[54] METHOD AND APPARATUS FOR FRACTIONATING MULTI-COMPONENT FEEDS

[75] Inventors: Alfred M. Peiser, Rocky Hill, N.J.; Matthew J. De Pasquale, Yardley, Pa.

[73] Assignee: Mobil Oil Corporation, New York, N.Y.

[22] Filed: Jan. 14, 1974

[21] Appl. No.: 432,913

[52] U.S. Cl. ................. 208/354; 208/357; 208/365
[51] Int. Cl. ........................... B01d 3/14; C10g 7/00
[58] Field of Search ........... 208/355, 365, 354, 366, 208/357

[56] References Cited
UNITED STATES PATENTS

| | | |
|---|---|---|
| 1,877,811 | 9/1932 | Coleman .......................... 208/354 |
| 1,997,675 | 4/1935 | Bahlke et al. ...................... 208/355 |
| 2,785,120 | 3/1957 | Metcalf .............................. 208/88 |
| 3,301,778 | 1/1967 | Cabbage ............................ 208/355 |

Primary Examiner—Herbert Levine
Attorney, Agent, or Firm—Charles A. Huggett; Carl D. Farnsworth

[57] ABSTRACT

A three tower pressure-vacuum distillation arrangement for separating crude oil into desired components and the inter-related heat recovery by the crude oil charged to the combination is described. The arrangement of the fractionation sequence along with the use of a reboiler heat in the pressured distillation tower increases the thermal efficiency of the overall process thereby reducing the heat requirement of the process.

11 Claims, 2 Drawing Figures

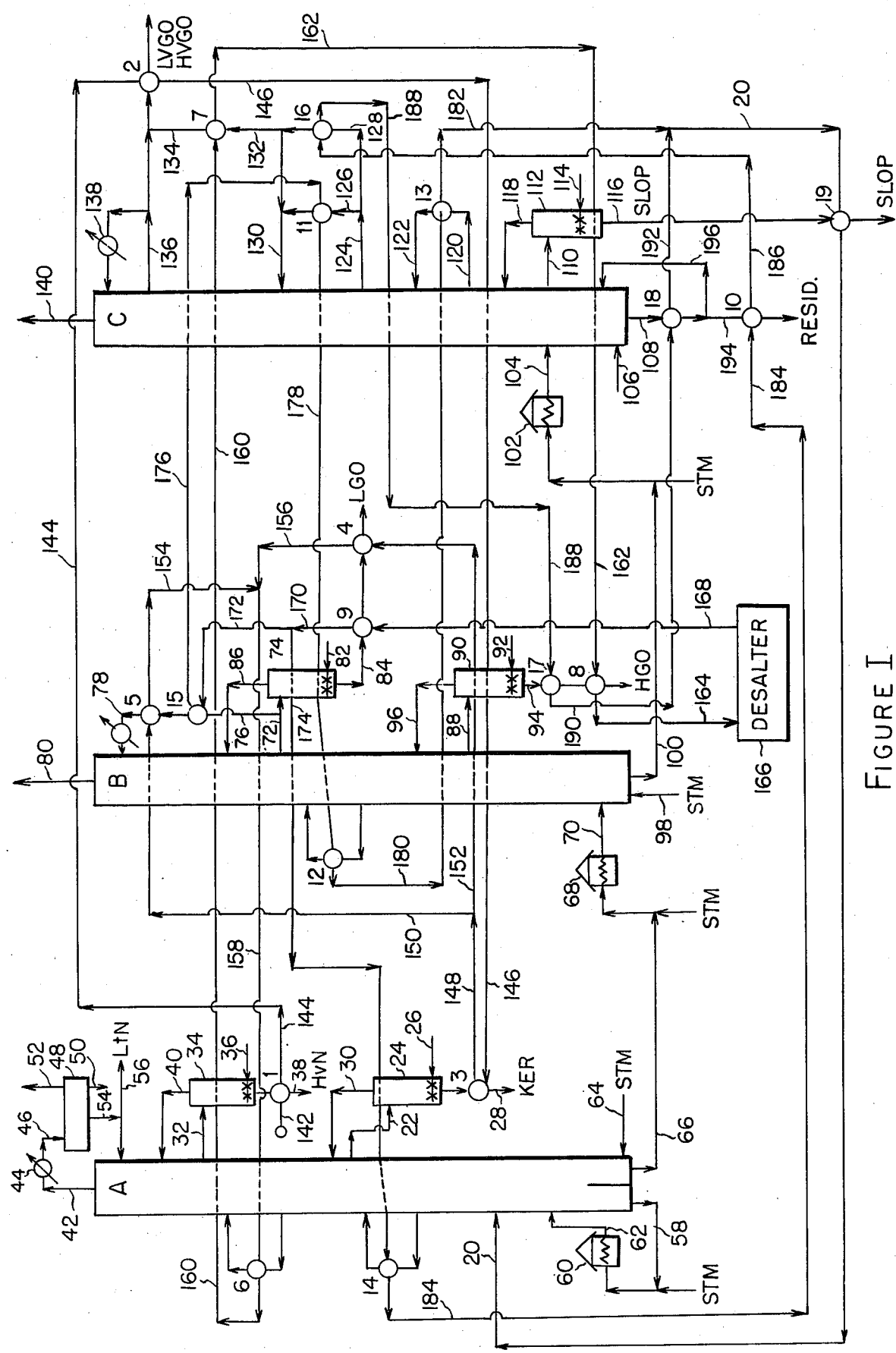
FIGURE I

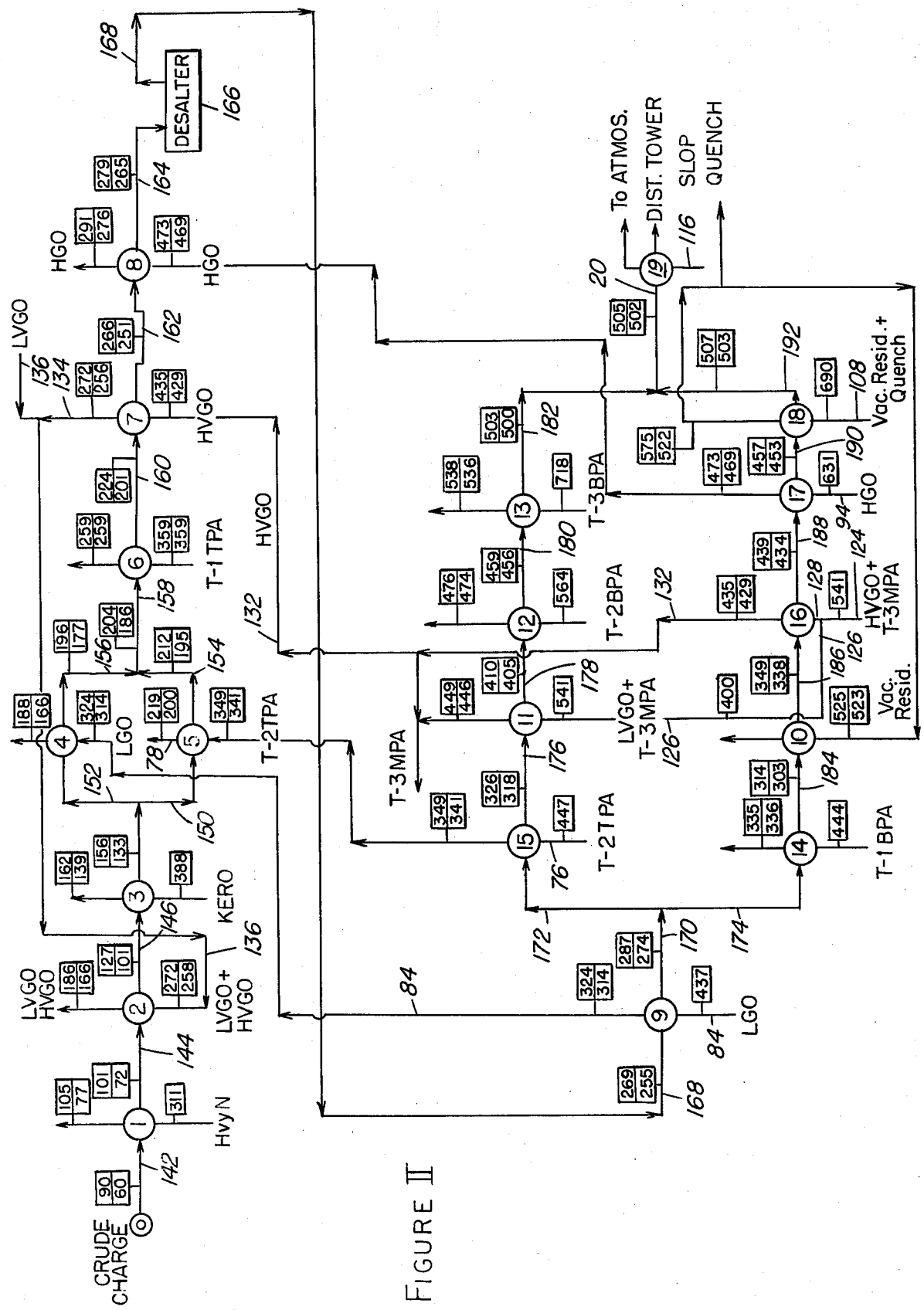
FIGURE II

METHOD AND APPARATUS FOR FRACTIONATING MULTI-COMPONENT FEEDS

BACKGROUND OF THE INVENTION

Countercurrent liquid-vapor fractionation such as used in distillation and adsorption columns is a separational procedure used most frequently in the petroleum and chemical industry. The investment in fractionating equipment, auxiliary operating equipment, piping and operating costs represents a large item in plant costs which it is most desirable to reduce.

In the conventional prior art processing of crude petroleum oil to recover fractions thereof suitable for upgrading in various refinery processing operations, the crude is first distilled or fractionated in an atmospheric distillation tower with residual material separated from the bottom of the atmospheric distillation tower being further separated in a vacuum distillation tower. In this combination operation, gas and gasoline are recovered as overhead products of the atmospheric distillation tower, heavy naphtha, kerosene and light gas oils are taken off as side streams and the residual material is recovered from the bottom of the tower as reduced crude. This residual fraction from the atmospheric distillation tower is then passed to a vacuum distillation tower. The products of vacuum distillation include vacuum gas oil and a heavy residual material known as vacuum reduced crude.

In the conventional prior art operation, the crude oil is heated by heat exchange means and furnace means in order to vaporize a portion of the crude to produce the products recovered from the atmospheric distillation tower. The preheated crude normally enters the lower portion of the tower and the vapors therefrom rise through the tower wherein they are cooled in selected stages producing successively lighter liquids which are separately withdrawn as sidestream products. Excess liquid runback known as overflash material joins the liquid portion of the entering crude to form the crude tower bottoms. Steam may be introduced to the bottom of the tower and various side strippers used to remove light material from withdrawn heavier liquid products.

In a large fractionating column where there are multiple withdrawals of the products comprising gas oils and lower boiling materials, the heat supplied must be sufficiently high to cause a more complete vaporization of the crude oil charge for flow upwardly through the tower. The vaporized material is condensed, collected and separated from different levels in the tower. In general therefore, a great amount or more usually an excessive amount of heat is required and provided to vaporize large portions of the crude along with some heavy bottom or residual material in order to provide the necessary amount of reflux material required in the tower above the feed inlet. Without this excess vaporization there is little or no reflux on the tower plates as required for efficient operation.

The present invention is concerned with an atmospheric-vacuum tower combination operation which will improve upon the economies of the overall operation and particularly the heat utility requirements of the operation.

SUMMARY OF THE INVENTION

An object of the present invention is to provide an improved combination of steps for separating crude oil under atmospheric and vacuum distillation conditions whereby the supplied heat requirements of the combination operation is substantially reduced and more efficiently utilized. A further object of the present invention is concerned with an improved combination and sequence of distillation apparatus provided with inter-related heat exchange steps for effecting heating and separation of a crude oil into desired components under more suitable atmospheric and vacuum distillation conditions. A still further object of the present invention is directed to the combination of apparatus and sequence of process steps used to improve upon the recovery of available heat provided by the separated streams in the combination operation.

The present invention relates to an improved process and combination of apparatus for separating a petroleum crude oil into low and higher boiling hydrocarbon fractions. The process combination of the present invention generally comprises three separate stages of distillation comprising a relative high pressure atmospheric distillation step and a vacuum distillation step in combination with an intermediate pressure distillation step. In this combination the parameters of heating and cooling are restricted, selected and inter-related to minimize the heat loss of the operation. In the combination operation of this invention, the crude oil is heated sufficiently to minimize overflash of the charge but vaporize kerosene and lower boiling components which are then separated in a first pressured distillation zone from material higher boiling than kerosene in the crude oil charge. The material higher boiling than kerosene is then preferably separated in a sequentially arranged decreasing pressure distillation zones of which the last distillation zone is a vacuum distillation zone. In this combination, the crude oil charge is indirectly heated with a plurality of the product and recycle streams separated from the combination of distillation zones to provide a temperature sufficiently elevated to accomplish vaporization and separation of kerosene and lower boiling components from the remaining crude oil charge at a pressure generally above atmospheric pressure in a first distillation zone. By employing the process sequence and operating conditions of the present invention, thermal degradation of the oil charge passed to the various distillation zones or towers of the process combination is considerably reduced. In this improved combination, the initial relatively high pressure distillation step is aided by using a furnace reboiler system or arrangement in association with the lower or bottom portion of the pressured distillation tower. Steam may be combined with the tower bottoms before passing through the reboiler furnace heater to reduce coking of the feed in the furnace tubes. Also, steam injection to a bottom portion of the tower may be used to strip desired low boiling components from the residual oil in the bottom of the tower. Material higher boiling than kerosene is withdrawn from the bottom of the tower, combined with steam and heated in a second furnace zone to a temperature of about 725°F. before being passed to the lower or bottom portion of a lower pressure or intermediate pressure distillation zone. Temperature control of the material higher boiling than kerosene remaining in the residual crude material charged to the intermediate pressure distillation zone in combination with steam is relied upon to avoid coking in the lower portion of the intermediate pressure distillation zone. A light and heavy gas oil component of the crude oil charge and any lighter material remaining in the residual oil separated from the initial distillation zone are separated from higher boiling residual material in the intermediate distillation zone.

As provided herein, the intermediate distillation zone may be maintained at atmospheric pressure, below or above atmospheric pressure. In any event its pressure is maintained below the pressure employed in the initial distillation zone and the pressure-temperature relationship of the intermediate tower is selected to particularly accomplish the separation and recovery of light and heavy gas oils from the residual oil charge to the tower.

A high boiling residual material separated as a bottoms product of the intermediate pressure distillation zone is then combined with steam, heated in a furnace zone to a temperature of about 770°F. and then introduced into a lower portion of a vacuum distillation zone. The vacuum distillation zone maintained at a subatmospheric pressure is relied upon to separate light and heavy vacuum gas oil material recovered as separate or combined streams from higher boiling slop oil and a resid material. In this combination, the recovery of a slop oil fraction boiling generally in the range of 1,070°F. to about 1,105°F. and of reduced asphalt content may be used as lube oil base stocks. Furthermore, the propane deasphalting requirements of this material will be lessened thereby reducing the size and operating costs of any associated PDA unit. Thus the particular distillation operation of this invention contributes to a related operation in a refinery complex.

Steam injection in the bottom portion of the intermediate and vacuum pressure distillation zones considerably aid with obtaining separation of a high boiling residual oil from lower boiling material in each zone in addition to minimizing the formation of coke or carbonaceous residue particularly in the bottom portions of these zones. Also combining steam with the oil charge passed to each furnace preheat zone upstream of the intermediate and vacuum distillation zones further facilitates separation of the hydrocarbon charge during distillation in combination with reducing the coke forming tendency of the oil charged to each zone.

An important aspect of the combination operation of the present invention is that the arrangement of the fractionation sequence along with the use of a reboiler in the pressured tower increases the thermal efficiency of the overall process and results in a reduced heat requirement for the process. In addition, the heat recovery system and its use to accomplish preheating and separation of the crude oil charge into desired component fractions further improves the overall heat utilization efficiency of the operation. Preheating the crude oil charge initially introduced to the atmospheric distillation zone by the combination of heat exchange steps herein described and the use of the recovered heat in the process combination is an essential ingredient of the process efficiency to which the present invention is particularly directed. Thus the combination operation of the present invention is particularly oriented to minimize the fuel requirement of the process.

The operating conditions of the separate distillation zones may be varied without departing from the concepts of the invention. Thus the initial distillation tower may be operated with a top pressure in the range of 20 to 100 psia and a top temperature in the range of 250° to 350°F. The residual oil fraction higher boiling than kerosene withdrawn from the bottom or lower portion of the first distillation zone may be at a temperature in the range of 600°F. to 730°F. The intermediate distillation zone may be operated at a pressure in the range of 2 to 20 psia and a top temperature in the range of 150° to 250°F. A residual oil fraction higher boiling than heavy gas oil withdrawn from the bottom of the intermediate pressure distillation zone may be at a temperature in the range of 625°F. to 725°F. The third distillation zone or deep vacuum distillation zone may be operated at a top pressure in the range of 0.3 to 2 psia and a temperature of 150°F. to 200°F. Generally the temperature in the bottom of this zone will be from 650°F. to 750°F. The temperature conditions used in each distillation zone may vary considerably depending upon the type of crude processed; that is, whether it is paraffinic or asphaltic; upon the amount of steam used therein and the depth of cut made into the residual component of the crude.

The combination operation of the present invention is instrumental in reducing the diameters of the towers used. More important is the significant reduction in fuel requirements of the combination and this is most significant now with the considerably higher fuel costs and particularly the shortage thereof.

Thus an object of the present invention is to provide an operation wherein the total heat requirements of the combination distillation operation is significantly reduced and the heat provided is repeatedly used and recovered in a number of separate steps. Thus the amount of cooling required and heat loss in the recovery of desired product streams is considerably reduced.

BRIEF DESCRIPTION OF THE DRAWINGS

FIG. I is a diagrammatic presentation of an arrangement of distillation zones comprising an atmospheric, vacuum and intermediate pressure distillation zone with connecting piping for the transfer and recovery of products between and from the combination of zones.

FIG. II is a simplified diagrammatic presentation of the heat exchange train used in FIG. I for more completely optimizing the heat recovery of the combination operation.

DISCUSSION OF SPECIFIC EMBODIMENTS

Referring now to FIG. I by way of example, there is shown a combination of interconnected distillation zones A, B and C in which combination, zone A is referred to as a pressured distillation zone, zone "C" is a vacuum distillation zone and zone "B" an intermediate pressure zone is maintained at a pressure intermediate the pressure of zones "A" and "C." Thus zone "B" will be referred to herein as an intermediate pressure distillation zone. In a specific case zone "A" is maintained at a top pressure of about 15 psig (30 psia), zone "C" at a top pressure of about 0.5 psia and zone "B" at a top pressure of about 1.3 psig (16psia).

Steam is employed in suitable amounts in the intermediate and vacuum distillation zone along with a selection of temperature and pressure conditions which will generally improve the overall operating economy of the combination operation during separation of a crude oil into many different desired fractions. Thus the use of low pressures tends to hold the distillation temperature down and this makes the distillation operation more efficient.

To facilitate a better understanding of the combination operation of this invention, the heat exchangers in the system of FIG. II have been consecutively numbered and the same numbers used in FIG. I to identify the exchangers in the process streams separated from each distillation zone.

In the combination operation of FIG. I, a crude oil such as an Arab Medium Crude heated by indirect heat exchange in the system of FIG. II as hereinafter described is introduced to pressurized distillation zone or tower "A" by conduit 20 at a temperature of about 502°F. for a winter type operation. Winter and summer operating temperature conditions are identified on FIG. II. A higher temperature approaching 525°F. may also be employed. The thus indirectly heated crude is preferably introduced to a lower portion of tower "A" above the reboiler system used therewith under conditions which permit flashing overhead for separation and recovery, primarily kerosene boiling range hydrocarbons and lower boiling hydrocarbons in an upper portion of the tower. The pressurized distillation zone or tower "A" is operated with two pump around systems comprising an upper system involving heat exchanger 6 and a lower system involving heat exchanger 14 for cooling portions of withdrawn tower liquid before return to the tower as reflux. Heat exchanger 6 reduces the liquid temperature to about 259°F. before return as reflux and exchanger 14 reduces the liquid temperature to about 335°F. A kerosene boiling fraction is recovered from the tower by conduit 22 above the intermediate pump around system and passed to a stripper 24 supplied with stripping gas such as steam by conduit 26. Stripped kerosene product is withdrawn by conduit 28 provided with heat exchanger 3 to which crude oil charge is passed by conduit 146 as shown in FIGS. I and II. Stripped hydrocarbons and steam at a temperature of about 408°F. are removed from zone 24 by conduit 30 for return to distillation tower " A" above the point of withdrawal of the kerosene fraction. The pump around system comprising heat exchanger 6 returns withdrawn liquid to an upper portion of the tower beneath the heavy naphtha withdrawal tray at a temperature of about 259°F. Crude oil in conduit 158 recovers heat from the pump around system with exchanger 6. The pump around system comprising heat exchanger 14 returns cooled liquid to the tower beneath the kerosene fraction withdrawal tray at a temperature of about 335°F. A heavy naphtha containing fraction is withdrawn by conduit 32 from an upper portion of tower "A" and passed to stripping zone 34 wherein it is contacted with stripping steam introduced by conduit 36. Stripped heavy naphtha boiling from about 290°F. up to about 420°F. at a temperature of about 311°F. is withdrawn by conduit 38 provided with crude oil charge to be separated in the tower combination of this invention and at a temperature of about 60°F. is passed through heat exchanger 1 to raise its temperature to about 72°F. Stripped hydrocarbons and stripping gas at a temperature of about 330°F. are removed from the upper portion of zone 34 by conduit 40 and returned to an upper portion of zone "A." Light naphtha, steam and lower boiling hydrocarbons are removed from an upper or top portion of tower "A" by conduit 42 at a temperature of about 283°F. This light fraction is cooled in air cooler 44 to a temperature of about 146°F. and then passed by conduit 46 to drum 48. In drum 48 condensed sour water is separated and removed by conduit 50; gases lower boiling than light naphtha are separated and removed by conduit 52; and the condensed light naphtha is removed by conduit 54 for recycle in part as reflux at a temperature of about 146°F. to the upper portion of atmospheric tower or zone "A." The remaining portion of the recovered light naphtha not refluxed is recovered by conduit 56 and may be further cooled by means not shown to about 100°F.

A reboiler is provided in the lower portion of tower "A" to maintain a desired bottom tower temperature. In this reboiler arrangement, material is withdrawn at a temperature of about 623°F. by conduit 58, combined with steam if desired and passed through a fuel fired furnace 60, wherein the withdrawn oil is heated to a temperature of about 711°F. before return to a lower portion of the tower by conduit 62. Steam may be introduced to the bottom of the tower by conduit 64. A residual fraction or bottoms product stripped of kerosene and lower boiling material is withdrawn from the bottom of tower "A" by conduit 66 at a temperature of about 695°F. for transfer to the intermediate pressure distillation zone or tower "B." The topped crude or residual fraction comprising material boiling above kerosene in conduit 66 is passed with added steam through a furnace zone 68 wherein it is heated to a temperature of about 725°F. The residual material thus heated is then introduced to the lower portion of the intermediate pressure distillation zone "B" by conduit 70 below a heavy gas oil withdrawal tray. Distillation zone "B" is maintained at a top pressure of about 16 psia. A pump around system comprising heat exchanger 12 is provided in an upper intermediate portion of zone "B"for withdrawing liquid material at a temperature of about 565°F. which is cooled in exchanger 12 to a temperature of about 474°F. before return thereof to zone "B." Cooling is accomplished in exchanger 12 by crude oil passed thereto by conduit 178.

A light gas oil containing fraction is withdrawn by conduit 72 from zone "B" and above the pump around system with a portion thereof being conveyed at a temperature of about 446°F. to a stripping zone 74. A portion of the withdrawn liquid in conduit 72 is diverted by conduit 76 sequentially through heat exchangers 15 and 5 and then an air cooler wherein the liquid is cooled for return by conduit 78 to a top portion of zone "B" as reflux at a temperature of about 200°F. Crude oil in conduit 172 is passed to heat exchanger 15 and crude oil in conduit 150 is passed to heat exchanger 5 as shown in the figures. Uncondensed vapors including steam are withdrawn from the top of zone "B" by conduit 80 for further cooling and separation by means not shown. The light gas oil passed to stripper 74 is stripped with steam introduced by conduit 82 to zone 74. The stripped light gas oil is withdrawn by conduit 84 and passed sequentially through heat exchangers 9 and 4 for recovery of heat therefrom with crude oil in conduits 168 and 152 respectively as shown and more fully discussed with respect to FIG. II. Material stripped from the light gas oil is returned at a temperature of about 446°F. by conduit 86 to an upper portion of tower "B."

A heavy gas oil containing fraction at a temperature of about 655°F. is separated from a lower intermediate portion of zone "B" by conduit 88 for transfer to stripping zone 90. Steam stripping gas is introduced to zone 90 by conduit 92. A stripped heavy gas oil fraction is recovered from zone 90 by conduit 94 and thereafter it is passed sequentially through heat exchangers 17 and 8 to cool this heavy gas oil fraction. Cooling is accomplished by indirect heat exchange with oil charge in conduits 188 and 162 respectively as shown in the figures. Hydrocarbons stripped from the gas oil and steam are conveyed by conduit 96 at a temperature of about 645°F. from zone 90 for discharge in zone "B." Steam may be introduced to a bottom portion of zone "B" beneath the lower most tray provided therein by conduit 98 to reduce, if not avoid, the formation of coke in the bottom portion of zone "B."

A residual hydrocarbon fraction higher boiling than a heavy gas oil and more often referred to as a residuum is recovered from the bottom of zone "B" at a temperature of about 703°F. by conduit 100. This residuum fraction is combined with steam and then heated in furnace zone 102 to a temperature of about 770°F. before being introduced by conduit 104 to a lower portion of vacuum distillation zone "C." Steam is introduced to the bottom of tower "C" by conduit 106 to assist with separation of heavy vacuum gas oil and lighter material from higher boiling material comprising a slop fraction and a bottom resid material. The resid material separated in vacuum tower "C" is withdrawn from the bottom of the tower at a temperature of about 690°F. by conduit 108 and conveyed sequentially through two separate heat exchange zones 18 and 10. Crude oil charge in conduits 190 and 184 respectively is passed to these heat exchange zones as shown.

A slop material fraction of relatively low asphalt content and acceptable for lube base stocks after propane deasphalting (PDA) is withdrawn by conduit 110 from tower "C" at a temperature of about 748°F. stripped in zone 112 by steam introduced by conduit 114 and recovered by conduit 116. This recovered slop fraction at a temperature of about 728°F. is passed to heat exchanger 19 in the crude stream passed to tower "A." Stripped material and steam is returned at a temperature of about 741°F. to the vacuum tower "C" by conduit 118. A pump around system is provided in the intermediate section of tower "C" with heat exchanger 13 provided to lower the temperature of pump around liquid from about 718°F. to about 536°F. before return to the intermediate portion of the vacuum tower "C" by conduit 122. Provisions not shown are also provided for returning a portion of the pump around liquid without cooling for added temperature control flexibility.

A heavy vacuum gas oil containing material is withdrawn from an upper intermediate section of zone "C" and above the pump around system by conduit 124, which is separated into two streams 126 and 128 and separately passed through heat exchange zones 11 and 16 respectively. The heavy vacuum gas oil is passed through heat exchanger 11 to cool it to a lower temperature of about 436°F. before being returned by conduit 130 to an upper portion of distillation tower "C." The remaining portion of the heavy vacuum gas oil recovered from heat exchanger 16 is separated into two streams, one portion of which is returned to the tower by conduit 130 and the other portion is passed by conduit 132 to heat exchanger 7 wherein it is cooled from about 429°F. to about 256°F. Cooled heavy vacuum gas oil is recovered from exchanger 7 by conduit 134. As shown on the drawing, withdrawn oil in conduit 126 is passed to heat exchanger 11, oil in conduit 128 is passed to exchanger 16 and oil in conduit 132 is passed to exchanger 7.

A light vacuum gas oil fraction at a temperature of about 273°F. is withdrawn from an upper portion of vacuum tower "C" by conduit 136. A portion of this withdrawn light gas oil is cooled in an air cooler 138 to a temperature of about 122°F. before it is returned to the top portion of the tower as reflux. Another portion of the withdrawn light vacuum gas oil in conduit 136 is combined with the heavy vacuum gas oil at a temperature of about 256°F. in conduit 134 and the combined stream is then passed to heat exchanger 2 wherein the temperature of the combined light and heavy gas oil stream is reduced to about 166°F. Material boiling below the light vacuum gas oil is withdrawn from the top of zone "C" by conduit 140. Crude charge material in conduit 144 is passed to heat exchanger 2 as shown on the drawings.

The integrated and complex heat exchange system of the process combination of the present invention involving indirect heat exchangers identified in FIG. I and discussed above is presented in a more simplified form in FIG. II. In the indirect heat exchange arrangement represented in FIG. II, the heat exchangers are numbered to correspond with the sequential numbers used in FIG. I. The crude oil charged to the combination operation and its related heat exchange zones is introduced by conduit 142 to heat exchanger 1 in the stripped heavy naphtha stream recovered from tower "A." The introduced crude is passed through heat exchanger 1 in indirect heat exchange with the stripped heavy naphtha withdrawn from stripping zone 34 by conduit 38. In this heat exchanger the crude is preheated to a temperature of about 72°F. for winter operation or about 101°F. for summer operation. The winter and summer operating temperature profile is provided in FIG. II. The crude charge thus heated in exchanger 1 is passed by conduit 144 to heat exchanger 2 and in indirect heat exchange with the combined light and heavy vacuum gas oil stream withdrawn from vacuum distillation zone "C" as discussed above. The winter operation temperature profile will be discussed hereinafter. The partially heated crude in conduit 144 is further heated in indirect heat exchanger 2 to a temperature of about 101°F. before it is passed by conduit 146 to heat exchanger 3 provided in the kerosene stream withdrawn by conduit 28 from stripping zone 24. In heat exchanger 3, the crude is further heated to a temperature of about 133°F. and is withdrawn therefrom by conduit 148. The crude stream 148 is split into two separate streams 150 and 152. Crude stream 150 is passed to indirect heat exchanger 5 in the top pump around system of tower "B" wherein it is heated to a temperature of about 195°F. Crude stream 152 is passed to indirect heat exchanger 4 in the light gas oil stream withdrawn by conduit 84. In heat exchanger 4, the crude is heated to an elevated temperature of about 177°F. Preheated crude removed from heat exchangers 4 and 5 by conduits 154 and 156 are combined and passed by conduit 158 to heat exchanger 6 in the uppermost pump around system of the atmospheric distillation zone "A." In heat exchanger 6, the crude is heated to a temperature of about 201°F. with pump around material of tower "A" before being conveyed by conduit 160 to heat exchanger 7 in the heavy vacuum gas oil stream 132 withdrawn from zone "C." Heat exchanger 7 heats the crude to about 251°F. after which it is conveyed by conduit 162 to heat exchanger 8 in the heavy gas oil stream recovered by conduit 94 from stripping zone 90 adjacent the bottom portion of tower "B." The crude oil thus heated to a temperature of about 265°F. is passed by conduit 164 to a crude desalting zone 166. Crude oil separated from desalter 166 by conduit 168 is passed to heat exchanger 9 in the light gas oil stream in conduit 84 separated from stripping zone 74. The desalted crude oil is heated in exchanger 9 to a temperature of about 274°F. The desalted crude is removed from heat exchanger 9 by conduit 170 and separated into two streams 172 and 174. The crude stream in conduit 172 is passed sequentially through a plurality of heat exchange zones 15, 11, 12 and 13. Each of these heat exchangers may be a bundle of heat exchangers so that in actual practice, stream 172 may be further separated into one or more parallel streams which sequentially pass through bundles of heat exchangers in the sequence shown on the drawing. Similarly, stream 174 is passed sequentially through heat exchangers 14, 10, 16, 17 and 18. These exchangers may also be bundles of heat exchangers arranged for one or more parallel flowing crude streams. The crude in conduit 172, for example, is passed to heat exchanger 15 or a bundle thereof provided in the intermediate tower "B" top pump around system wherein the crude is heated to a temperature of about 318°F. The crude heated in exchanger 15 to a temperature of about 318°F. is then passed by conduit 176 to heat exchanger 11 or a bundle of such heat exchangers provided in the heavy vacuum gas oil pump around system of tower "C" involving withdrawal conduit 124, 126 and return conduit 130. In heat exchanger 11, the crude is heated to a temperature of about 405°F. The crude is passed from exchanger 11 by conduit 178 to heat exchanger 12 in the pump around system of tower "B" wherein the crude oil temperature is further raised to about 456°F. The heated crude oil is passed from indirect heat exchanger 12 by conduit 180 to indirect heat exchanger 13 or a bundle of such heat exchangers provided in the bottom pump around system involving streams 120 and 122 of tower or zone "C." The crude heated to about 500°F. in heat exchanger 13 is withdrawn by conduit 182.

The remaining portion of the crude oil separated from desalter 166 and comprising the stream in conduit 174 is conveyed to indirect heat exchanger 14 in the atmospheric tower lower pump around stream wherein the crude temperature is raised to about 303°F. The crude then passes by conduit 184 to heat exchanger 10 in the resid stream 108 withdrawn from the bottom of tower "C." In heat exchanger 10, the temperature of the oil is raised to about 338°F. before it is passed by conduit 186 to heat exchanger 16 in the heavy vacuum gas oil stream pump around and removed from zone "C" by conduits 124 and 128. The oil is heated to a temperature of about 434°F. in exchanger 16 before it is passed by conduit 188 to indirect heat exchanger 17 in the heavy gas oil stream 94 separated from stripping zone 90 of tower "B." The oil is heated to about 453°F. in exchanger 17 before it is passed by conduit 190 to heat exchanger 18 in resid stream 108 separated from the bottom of tower " C." In exchanger 18, the crude oil temperature is raised to about 503°F. before it is withdrawn by conduit 192.

The desalted crude oil indirectly heated in the downstream parallel heat exchange train above described and recovered in conduits 182 and 192 is combined to provide a preheated crude oil feed at a temperature of about 502 degrees in conduit 20. This combined and preheated crude oil charge is then passed through indirect heat exchanger 19 in the recovered slop oil stream 116. In exchanger 19, the crude oil is indirectly heated by the 728°F. slop oil before being charged to atmospheric distillation zone "A."

Resid material cooled in exchanger 18 is withdrawn by conduit 194 and a portion thereof is passed to exchanger 10 to which crude oil is passed by conduit 184. Another portion of the cooled resid in conduit 194 is recycled by conduit 196 as quench material at a temperature of about 522°F. to the bottom portion of tower "C."

It will be clear to those skilled in the art that the distillation combination of the present invention produces side streams and product stream varying considerably in temperature conditions and the heat exchange system of the present invention has taken advantage of these differences to provide a heat recovery operation which substantially improves upon the heat utilization efficiency and thus reduces the overall fuel requirements of the process.

In order to simplify the complex integrated system of this invention, liberty has been taken by not showing, pumps, valves, liquid level and flow control arrangements which are a part of the operation. Furthermore, the tower trays, packing and other apparatus have not been shown to simplify the drawing. However, the elimination of these necessary items is not to detract from the concept of invention described and hereinafter claimed.

Having thus provided a general discussion of the distillation process combination of the present invention and its inter-related heat exchange system and discussed specific examples in support thereof, it is to be understood that no undue restrictions are to be imposed by reason thereof except as defined by the following claims.

We claim:

1. In a crude oil distillation process arrangement comprising a pressured and a vacuum distillation zone, the improvement which comprises,
   a. providing an intermediate pressure distillation zone between said pressured and said vacuum distillation zones in sequential arrangement,
   b. passing a desalted crude oil preheated to a desired elevated temperature by indirect heat exchange with product streams recovered from the combination of distillation zone to a lower portion of said pressured distillation zone, recovering kerosene, heavy naphtha, light naphtha and lower boiling gaseous material separately from said pressure distillation zone above said crude oil charged thereto, recovering a residual oil fraction higher boiling than kerosene from a bottom portion of said pressure distillation zone,
   c. heating said recovered residual oil fraction to a higher temperature than its recovered temperature and thereafter passing it to a lower portion of said intermediate pressure distillation zone; separating heavy gas oil, light gas oil and lower boiling material from a higher boiling residuum material in said intermediate pressure distillation zone,
   d. heating said residuum material to a higher temperature than its recovered temperature and thereafter passing it to a lower portion of said vacuum distillation zone; separating light and heavy vacuum gas oil boiling material, separating a slop oil fraction of reduced asphalt content separately from resid material in said vacuum distillation zone; partially cooling resid material recovered from the bottom of said vacuum distillation zone and returning a portion of the cooled resid to a lower portion of said vacuum distillation zone as quench material, and e. providing incremental reboiler heat to a bottom portion of said pressured distillation zone in an amount adequate to accomplish separation of kerosene and lower boiling component from the pressured distillation zone.

2. The process of claim 1 wherein the crude oil charge is heated sequentially by passing it through indirect heat exchange zones in liquid streams separated from each of said distillation zone providing incremental heat duty sufficient to progressively raise the temperature of the crude oil charge up to an elevated temperature adequate for discharge into the lower portion of said pressured distillation zone.

3. The process of claim 2 wherein the indirectly heated crude oil charge is committed to a desalting operation following a partial heating thereof.

4. The process of claim 1 wherein separated residual and residium materials of the crude oil are separately heated in fuel fired furnaces to raise the temperature of each before discharge into the next succeeding distillation zone.

5. The process of claim 4 wherein steam is combined with at least the residuum material heated in the fuel fired furnace.

6. The process of claim 3 wherein the major portion of recovered indirect heat by the crude oil to raise its temperature above a desalting temperature is obtained from materials separated from the intermediate pressure and vacuum distillation zones.

7. The process of claim 4 wherein the crude oil charge following desalting thereof is separated into one or more parallel streams which pass through a combination of indirect heat exchange zones in the recovered product streams from said intermediate pressure and said vacuum distillation zone providing incremental heat duty sufficient to raise the temperature of each stream to a temperature sufficient for discharging the indirectly heated crude oil to said pressured distillation zone.

8. The process of claim 7 wherein the parallel streams of indirectly heated crude oil are combined before further indirect heating thereof by indirect heat exchange with slop material recovered from a lower portion of said vacuum distillation zone.

9. The process of claim 1 wherein steam in conjunction with selected temperature conditions is relied upon for controlling the formation of carbonaceous deposits in the lower portions of each of said distillation zone and in said fuel fired furnace zones.

10. The process of claim 1 wherein the light and heavy vacuum gas oil is recovered as a combined fraction.

11. The process of claim 2 wherein recovered light gas oil, heavy gas oil, vacuum gas oil and a liquid pump around in the intermediate distillation zone are each used to indirectly heat crude oil charge before and after desalting thereof.

* * * * *